INFORMATION STORAGE SYSTEM

Filed April 30, 1962 5 Sheets-Sheet 1

INVENTOR
C.Y. LEE
BY
R.C. Winter
ATTORNEY

INVENTOR
C.Y. LEE
BY
R. C. Winter
ATTORNEY

May 25, 1965 CHI-YUAN LEE 3,185,965

INFORMATION STORAGE SYSTEM

Filed April 30, 1962 5 Sheets-Sheet 3

INVENTOR
C. Y. LEE
BY
R. C. Winter
ATTORNEY

May 25, 1965 CHI-YUAN LEE 3,185,965

INFORMATION STORAGE SYSTEM

Filed April 30, 1962 5 Sheets-Sheet 4

INVENTOR
C.Y. LEE
BY
R. C. Winter
ATTORNEY

INVENTOR
C.Y. LEE
BY
R. C. Winter
ATTORNEY

United States Patent Office 3,185,965

Patented May 25, 1965

3,185,965

INFORMATION STORAGE SYSTEM

Chi-Yuan Lee, Chatham, N.J., assignor to Bell Telephone Laboratories, Incorporated, New York, N.Y., a corporation of New York Filed Apr. 30, 1962, Ser. No. 190,856
23 Claims. (Cl. 340—172.5)

This invention relates to information storage and retrieval systems and more particularly to such systems in which retrieval is based on content rather than location.

Memory units in current use may be divided into two broad classifications according to the manner of gaining access to the stored information. Some memory units store information at predetermined locations without regard to the particular content of the information being stored. Retrieval is then implemented by addressing the discrete storage location in the memory. Such retrieval requires extremely accurate and often quite complex access circuitry.

The other type of memory, referred to as associative memory, matches or associates the stored information with retrieval data applied to all storage locations or cells. Thus, in order to retrieve a stored item, retrieval data is applied to each storage cell. If a match with stored information is obtained, the desired item, stored in associated cells may be read out.

The information may be stored in a relatively permanent fashion, such as punched cards or magnetic tape, in which case retrieval by association is likely to be on a serial basis, the storage cells being observed in sequence until a match is obtained. Excessive amounts of information to be stored, without adequate facilities for updating, often result in bulky units of this type, with correspondingly increased retrieval time being required.

Parallel retrieval also has been investigated in view of the current need for extremely rapid retrieval of all data pertinent to a particular desired subject. For example, a computer may be required to provide a simultaneous account of all items in its store having a given characteristic. Such a requirement necessitates access to all discrete storage areas simultaneously as well as the ability to erase obsolete data and to store current data in its place.

Heretofore the associative type memory has been lacking in adequate means for erasure and storage of new data. Such means are normally independent of the retrieval circuitry and individual to the storage elements, which of course, adds to the complexity of the memory and detracts from its flexibility. Furthermore, contemporary memories of the associative type may not permit interaction between the individual cells in the memory or allow input information accepted by one cell to trigger the retrieval of stored data from a plurality of storage cells, thus further detracting from their flexibility.

Accordingly, it is an object of this invention to improve the operation of information storage and retrieval systems.

It is another object of this invention to improve the operation of an associative type memory and more particularly to increase the flexibility of such systems.

It is a further object of this invention to simplify storage and retrieval of data in an associative type memory.

It is a still further object of this invention to increase the speed of storage and retrieval of data in an associative memory.

These and other objects of the invention are realized in accordance with one specific illustrative embodiment of the invention by provision of a memory unit comprising an array of structurally identical storage cells capable of storing a unit or bit of data and communicating with adjacent cells.

During storage, symbols are written in the cells sequentially, such that a series of interconnected cells will contain identifying symbols, referred to as a name string, and a succeeding series of interconnected cells will contain the stored data symbols, referred to as a data string. During retrieval, a symbol is applied simultaneously to each cell in the memory and serves to activate only those cells containing the corresponding symbol. The activated cells in turn prepare adjacent cells to perform the matching function with succeeding input symbols. The process continues until all of the symbols in a name string have been applied to the memory and matched against the content of active cells.

A retrieval signal applied thereafter to each cell in the memory will trigger each currently active storage cell, which at this time includes only the first cell in each data string to be retrieved. Read out will continue through the successive cells in the activated data strings thus providing, in parallel form, all of the information identified by the particular applied name string. Advantageously, the process may also be reversed such that the input symbols during retrieval correspond to the stored data string. In this instance, upon initiation of the read out operation, the name strings, activated by the corresponding data strings matching the input symbols, will be obtained.

When it is desired to update the stored information, obsolete symbols may be erased from the appropriate series of storage cells, whereupon other stored symbols are advanced in the network to fill the gap produced by the erasure operation. This in turn provides empty storage cells at the end of the network chain of cells and permits the writing of symbols representing updated information in this particular area, thus avoiding the necessity for the storage of such symbols in random locations of the memory.

The storage cell in the memory network is a two condition unit. It contains components arranged to reflect the current state of the cell and other components arranged to reflect the stored symbol. Each of the cells contains memory devices such as a relay, a magnetic core, or a flip-flop, and the number of such devices may vary according to the number of coded elements necessary to identify the stored symbol. It is expected, however, that each individual cell will not vary in storage capability from any other cell in the memory.

Each cell is arranged to accept write, match and clock signals from the input circuitry and activating signals from adjacent cells. The respone of a cell to a particular signal is determined by the existing one of two possible acitivity states which the cell may assume as well as the symbol stored therein. Thus a particular cell may be storing a name symbol and may be active or passive at a particular time, while another cell may be storing a data symbol and may be active or passive at the particular time. However, if one or more name cells are active, all data cells would be passive at that time and vice versa.

Information may be retrieved from the memory on a direct basis which presumes that the application of a particular name string to the memory will eventually produce an output of the data stored adjacent to the last cell containing that name string. Matching is accomplished solely in name cells during direct retrieval, and when a match occurs, an advance signal is transmitted from the name cell to activate the adjacent name or data cell. When a data cell receives such an advance signal, it reads out the stored data as well as continuing the propagation of the forward signal to existing cells until all of the data identified by the particular name cell or cells has been retrieved.

It is also possible, through a process referred to hereinafter as cross retrieval, to retrieve one or more stored name strings upon the application to the memory of a sequence of symbols designating the corresponding data strings. In this instance information is propagated in the opposite direction to that effected during direct retrieval from data cells to name cells. The cell structure again is uniform throughout the memory, but a new identifier, referred to hereinafter as a tag symbol, is stored in the memory immediately preceding each name string and each data string. Thus the tag symbol specifically identifies that a name string or data string is stored in succeeding cells, dependent upon the specific tag symbol employed. Also an external comparison circuit is provided which matches the various outputs of the memory against a particular tag symbol, and when a match is encountered in the external comparison circuit, the retrieval operation is completed.

Information also may be erased from any portion of the memory network. In conventional memories this, of course, would mean that a gap would be produced at a distinct position in the network, thus requiring specific addressing circuitry in order to write new data in the empty space produced by erasure. However, in accordance with this invention, a memory unit is arranged such that data stored in succeeding portions of the network is advanced so as to fill the vacancy caused by erasure. This results in the availability of space for the storage of new information in a section at one end of the network equivalent in size to the erased section. Since the space available for writing in this instance always appears at one end of the series connected network, the writing procedure need only identify the first empty cell in the network and assign information to be recorded to all succeeding cells. Thus the need for specific addressing circuitry again is obviated.

It is a feature of this invention that an information storage retrieval system comprise a series network of equivalent storage cells in which each cell is interconnected with the adjacent cells in the series and is arranged to receive simultaneously each input signal externally applied to the network.

It is another feature of this invention that each storage cell in the network respond to input signals when in a particular state to activate an adjacent cell.

It is a feature in accordance with one aspect of this invention that each of the series connected storage cells be arranged to activiate a selected one of the immediately adjacent cells to which it is connected, as determined by an externally applied signal.

It is a still further feature of this invention that apparatus be provided for retrieving data from a plurality of interconnected cells upon matching input information with the content of one or more adjacent cells connected to the plurality of cells.

More particularly, it is a feature of this invention that apparatus be provided for retrieving data concurrently from a plurality of groups of data storage cells having a distinct number of storage cells in each group.

It is still another feature of this invention that apparatus be provided for erasing the content of a plurality of interconnetced storage cells and for advancing the content of succeeding cells in the network to fill the gap produced by the erasure.

It is yet another feature of this invention that control circuitry be provided in each storage cell for indicating the first vacant cell in the network, only the first vacant cell accepting the firist bit of information during the storage operation, succeeding cells in the network each accepting corresponding succeeding bits of the input information.

A complete understanding of this invention and of the above-noted and other features thereof may be gained from consideration of the following detailed description, with reference to the accompanying drawing, in which.

Figure 1:
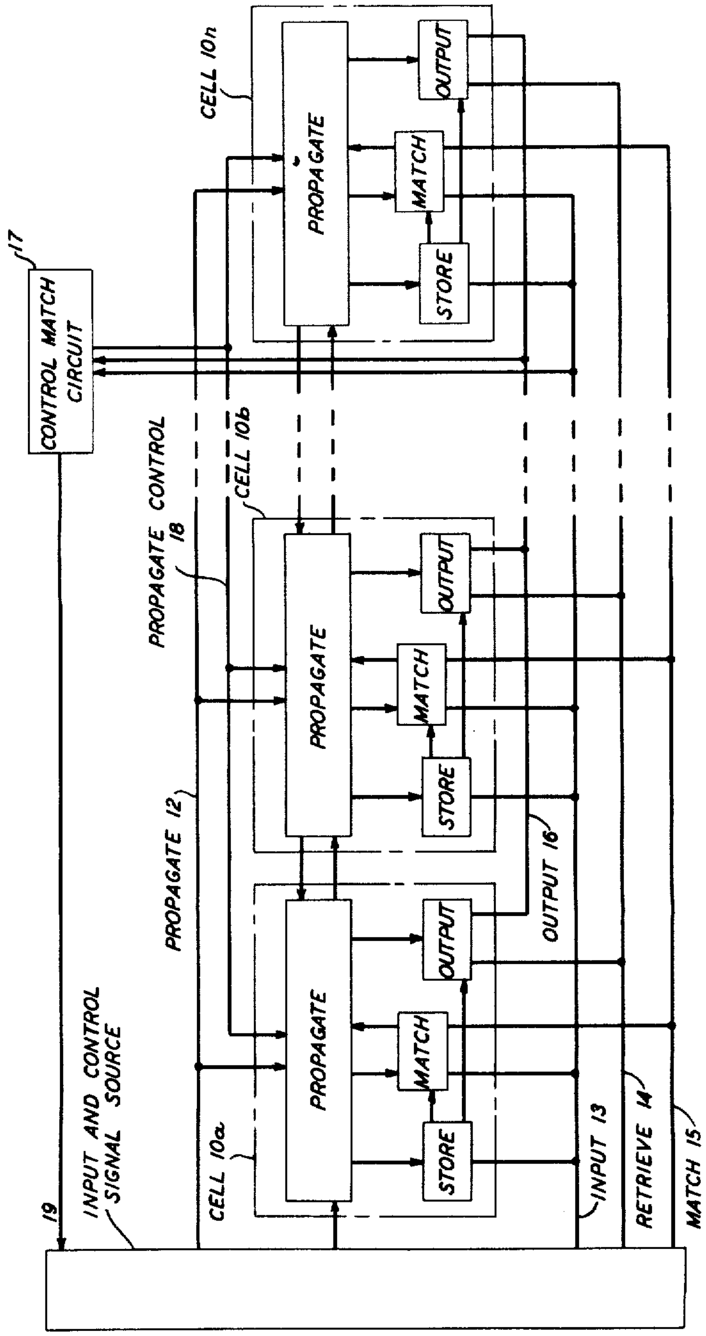
FIG. 1 is a simplified block diagram representation of one specific illustrative embodiment of this invention.

Turning now to the drawing, the basic elements of an associative memory unit for performance of storage and retrieval operations illustrative of one specific embodiment of this invention are depicted in FIG. 1. As there shown, the memory unit comprises a plurality of storage cells 10*a*–10*n*, each of which is connected to at least one, and no more than two, adjacent cells. Thus the arrangement forms a series network of interconnected cells, with each cell connected to the preceding and succeeding cells in the network chain.

The cells, although indistinguishable from one another in structural elements and their interconnection, are each arranged to store a symbol which comprises a portion of the identity or name for a stored message or a specific portion of the message itself. When placed in the condition for identifying a message, the cell is referred to as a name cell. It retains this condition until the particular message it aids in identifying is no longer required to be stored in the memory and is erased. In similar fashion cells storing the message symbols are referred to as data cells. It may require more than one symbol to designate the name identifying a particular message, in which case the name cells occupy adjacent positions in the network and are referred to as a name string. Similarly, a succeeding string of data cells present the actual stored message and are referred to as a data string.

Each cell 10*a*–10*n* contains input, match, output and propagate circuits. Signals are supplied to each match circuit over leads represented by match cable 15 and input cable 13, whereupon the content of each cell 10*a*–10*n* is matched against the applied symbols. When a match occurs in a particular one of the cells 10*a*–10*n*, a signal is transmitted from its propagate circuit to one of the adjacent cells. This action activates the propagate circuit in the neighboring cell, thereby placing it in condition for a possible match of its content with the next applied symbol.

The direction of propagation is determined by signals present on leads represented by propagate cable 12 which also provide signals to each of the cells 10*a*–10*n*. When the matching operation is completed, the propagate signals permit activity condition signals to be propagated between adjacent interconnected cells, the direction of propagation being controlled externally. An output cable 16, also connected to each of the cells 10*a*–10*n*, is activated by signals applied to the retrieve cable 14 after the matching operation to permit retrieval of information from those cells which were appropriately primed for retrieval by the intercell activity. A control match circuit 17 common to all cells is connected to the output cable 16 and serves to compare the outputs of the various cells 10*a*–10*n* with predetermined information symbols designating various stages of the operation, a match resulting in predetermined transitions in the cells. Primarily for purposes of cross retrieval, to be considered hereinafter, it is necessary to identify the beginning of a name string and the beginning of a data string. For this purpose a special designation, referred to hereinafter as a tag symbol, is provided and stored in the cell immediately preceding each name and data string.

Initially consider an empty network of storage cells 10*a*–10*n*. During the storage process, a plurality of symbols will be applied in sequence to the cell network over input lead 13. During the storage operation, the cells are arranged to be triggered successively by the applied input information and by the preceding cell upon storage therein of the input information. Thus cell 10*a* will store the first received symbol and activate cell 10*b* to receive the second applied symbol and so on until all of the applied information has been stored, at which point the next succeeding cell in the network will be activated to receive the first symbol of the next block of information to be stored.

Let us assume that the following information is to be applied to the first nineteen cells in the empty network of cells 10*a*–10*n*:

| | | | | | | | | | | | | | | | | | | | |
|---|---|---|---|---|---|---|---|---|---|---|---|---|---|---|---|---|---|---|---|
| Position | 1 | 2 | 3 | 4 | 5 | 6 | 7 | 8 | 9 | 10 | 11 | 12 | 13 | 14 | 15 | 16 | 17 | 18 | 19 |
| Symbol | $\alpha$ | A | $\beta$ | $a$ | $b$ | $\alpha$ | A | B | $\beta$ | $c$ | $a$ | $\alpha$ | A | C | $\beta$ | $c$ | $b$ | $a$ | $\alpha$ . . . |

The symbols $\alpha$ and $\beta$ are tags indicating, respectively, the beginning of a name string and the beginning of a data string. The name strings in this group of input information comprise A, AB and AC. Each of the name strings is preceded by the appropriate tag $\alpha$ and succeeded by the tag $\beta$ indentifying a data string. The data strings include *ab*, *ca* and *cba*.

Figure 3:
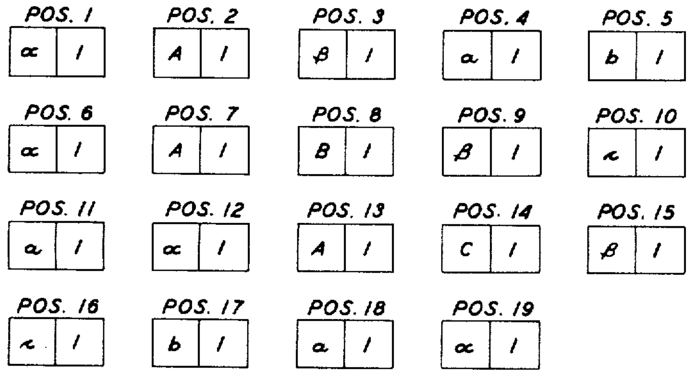
FIGS. 3 through 5 are diagrams depicting the network content in various stages of the storage and retrieval operations performed in accordance with the specific illustrative embodiment of this invention.

Each bit of data or symbol in the above-designated information, as stored in the network, is assigned the subscript 1 in FIG. 3, indicating that the cell storing the corresponding symbol is in a passive state. Upon completion of the storage operation, the designated symbols will appear in the same sequence in the series network of storage cells 10*a*–10*n*, all of which will be placed in a passive state. Thus the network would appear as illustrated in FIG. 3, in which condition it is prepared for the matching operation which is the first step in the retrieval of any string or strings of data from the network given a corresponding name string, or the retrieval of any name or names given a corresponding data string.

At this point let us consider for purposes of illustration that it is desired to retrieve the data string *ca*, stored in positions 10 and 11, the corresponding name of which is AB in the foregoing example. Since there is actually no prior knowledge as to which cells contain this data string, it must be identified by applying each of its name symbols and appropriate tags in sequence to all of the network cells; viz., $\alpha$, A, B, $\beta$. Initially then all of the cells receive the tag symbol $\alpha$ and are required to match their content against it. Each cell containing the $\alpha$ tag is arranged to transmit a signal to the succeeding cell in the network upon completion of this matching operation.

Figure 4:
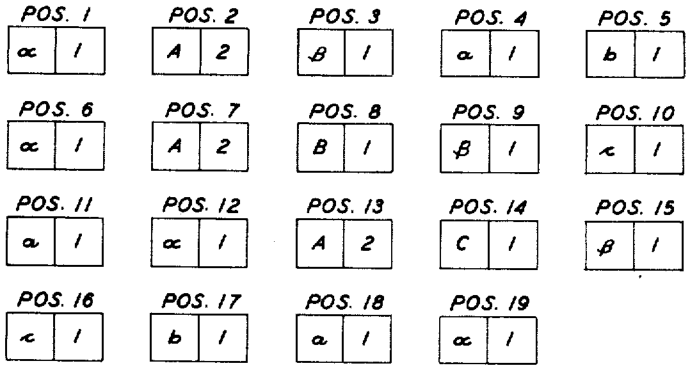

Every cell which receives a signal from an adjacent cell changes from the passive state to an active state designated by the subscript 2. Thus, as indicated in FIG. 4, the cell to the right of any cell storing $\alpha$ is placed in the active state.

Figure 5:
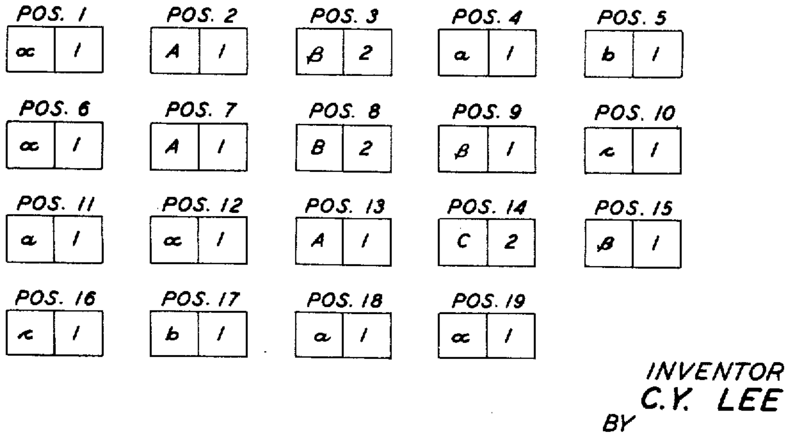

During the next match cycle all active cells; viz., positions 2, 7 and 13, will match their individual contents against the next input symbol A. In the example the three active name cells storing A at this time thereupon transmit an activating signal to the succeeding cells in positions 3, 8 and 14 and restore themselves to the passive state indicated by the subscript 1. Thus in our example the network after the second matching operation will appear as illustrated in FIG. 5.

The next input symbol is B. Only the active cell containing the matching symbol B in position 8 will, in this instance, deliver an activating signal to the succeeding cell. Thus the final input symbol $\beta$ will find that the only active cell in the network is in position 9 and has stored therein the matching signal $\beta$. The match results in activation of the cell in position 10 storing *c*, the first data symbol to be read out. This completes the chain of input signals serving to locate the particular data string.

A signal now is applied to the retrieve cable 14, serving to provide on output cable 16 the first data symbol *c* from the activated data cell. The position 10 cell storing the symbol in turn transmits an activating signal to the adjacent cell, position 11 storing the data symbol *a*, and resets itself. In this fashion each symbol in the data string is read out in sequence on output cable 16.

The control match circuit 17 contains the symbol $\alpha$ during this direct retrieval operation. The $\alpha$ symbol is compared with each symbol in the data string as it is read out of the network, and when a match occurs, the network automatically discontinues the read out operation. At this point the complete data string has been read out, and the network is ready to receive the next request for stored information.

In similar fashion a cross retrieval operation may be implemented whereby a name string is located and read out of the network upon application to the network in reverse order of the corresponding data string. The first symbol applied to the network again is $\alpha$, this time in conjunction with signals on propagate cable 12, causing the advance signals to propagate in the opposite direction. Consider that in the example illustrated in FIGS. 3–5 it is desired to read out the name string comprising the single symbol A in position 2. Since the propagation is now from a data string to a name string, the data string identifying the desired name string is applied to the network in reverse order. Thus in order to identify the name string A, the sequence of symbols on input cable 13 is $\alpha$, *b*, *a*, $\beta$, with the tag symbol $\alpha$ again being stored in the control match circuit 17 for control of the read out operation. The sequence of operations is similar to that described hereinbefore with reference to FIGS. 3–5, the only distinction being that propagation is to the left rather than to the right in the network as illustrated.

It is also desirable in many applications to store a variety of data strings in the network with a common identifying name string; e.g., the telephone numbers of all subscribers living on the same street in a particular town. In this instance the output matching operation in circuit 17 is not utilized. Instead, the cells containing tag symbols are arranged to ignore an activating signal received from an adjacent cell during read out. Thus the data strings being read out simultaneously may be of varying lengths, the operation continuing until all data strings have been completely read out. In this instance, of course, the output circuitry would contain appropriate buffer storage facilities to permit a plurality of data strings to be assimilated and made available in serial form for detailed analysis or merely counted, dependent upon the particular purpose of the retrieval.

The fact that each storage cell in the network corresponds to every other cell in logic and memory elements contained therein removes all restrictions on the network as to the cells which must store name symbols, data symbols or tag symbols. In this fashion the cells in the network are completely interchangeable, and information may be stored serially in the network merely by locating the first empty cell in the serially connected chain of network cells. It is evident, however, that when it is desired to remove information from the network, a vacant section or gap in the network chain would result, and the writing of additional information in the network, beginning with the first available empty cell, might result in the overlapping of new information with previously stored information. For this reason the network in accordance with this invention is arranged in such a manner that gaps produced by erasure of information are filled by advancing the data stored in the balance of the network chain until the gap has been closed. This, of course, produces empty cells at the end of the network chain which are then available for the storage of new information without overlapping previously stored information. The network illustrated in FIG. 1 is suitable for this operation.

For the initial erasure operation, the tag symbol and name string identifying the particular information to be erased are applied in the usual manner to the input cable 13. In this instance it is assumed that no two of the name strings stored in the memory are identical. Thus, for example, it is assumed that the symbols $\alpha$, A, B, $\beta$ are applied as the input information to initiate an erase operation in the memory containing the chain of information set forth in the earlier example and illustrated in FIGS. 3–5. Since it is assumed that no two name strings are the same, only the cell in position 9 storing the $\beta$ symbol will be activated at the end of the process.

Normally at this point the read out operation would begin with propagation of the activity signal through the data chain *a*, *b*. However, in order to satisfy the requirements, propagate cable 12 now applies signals which cause currently active storage cells to propagate signals in the opposite direction, in this instance to the left in the illustration of FIG. 3. The output from each active cell is compared with the content of the match circuit 17, which at this time is $\alpha$. Thus when the cell in position 6, storing the symbol $\alpha$, once again is reached, the network is set for the erasure operation.

The output of the match circuit 17 initiates the erasing of the symbol contained in cell position 6. Thereafter the symbol in each storage cell to the right of position 6 is erased by applying appropriate erasure signals to the input cable 13 concurrent with signals on the propagate leads 14 directing propagation to the right. The erasing of information is concluded upon reaching the next stored symbol $\alpha$, which symbol is once again compared with the $\alpha$ stored in the match circuit 17. The resultant output signal concludes the erasure operation, and the information stored in the memory at this point appears as follows:

| Position | 1 | 2 | 3 | 4 | 5 | 6 | 7 | 8 | 9 | 10 | 11 | 12 | 13 | 14 | 15 | 16 | 17 | 18 | 19 | |
|---|---|---|---|---|---|---|---|---|---|---|---|---|---|---|---|---|---|---|---|---|
| Symbol | $\alpha$ | A | $\beta$ | *a* | *b* | 0 | 0 | 0 | 0 | 0 | 0 | $\alpha$ | B | C | $\beta$ | *c* | *b* | *a* | $\alpha$ | . . . |

where 0 corresponds to a vacant storage cell.

The network, upon erasure of information from a portion thereof, must now effectively close the gap left by erasure in order to be in a position to receive new information at the end of the series of storage cells currently occupied by symbols. The gap closing operation begins with the activation of distinct activity circuits X and Y in position 1, the first storage cell of the network chain. A retrieval operation is then initiated, and if the symbol read out of position 1 is not a blank, the operation calls for the symbol to be written in the cell which has the X activity circuit active. In this instance, of course, the position 1 cell satisfies this requirement, so that the symbol is merely rewritten therein. At the same time both the X and Y activity circuits propagate signals to the next storage cell in the network, that in position 2.

This operation continues until the gap is reached. The first storage cell in the gap, position 6, will read out the blank symbol and only propagate a signal to the next storage cell from the Y activity circuit. Thus when the operation has traversed the gap, the first cell in the gap, position 6, will have the X activity circuit active, while the final cell in the gap, position 11, will have the Y circuit active. The first cell following the gap, position 12, has the symbol $\alpha$ stored therein, and upon receipt of the signal from the Y activity circuit of the cell in position 11, the $\alpha$ symbol is read out and written in the cell in the chain having the X circuit active, which in this case is the cell in position 6. This action is followed by the propagation of signals from the X activity circuit in cell position 6 to the next cell in the gap, position 7. The operation is then repeated through the remaining cells in the network. Of course each time a transfer is concluded, a new gap is formed or, more accurately, the string of vacant cells formed in the gap is moved along the network until it becomes the terminal group of cells in the series.

Figure 2:
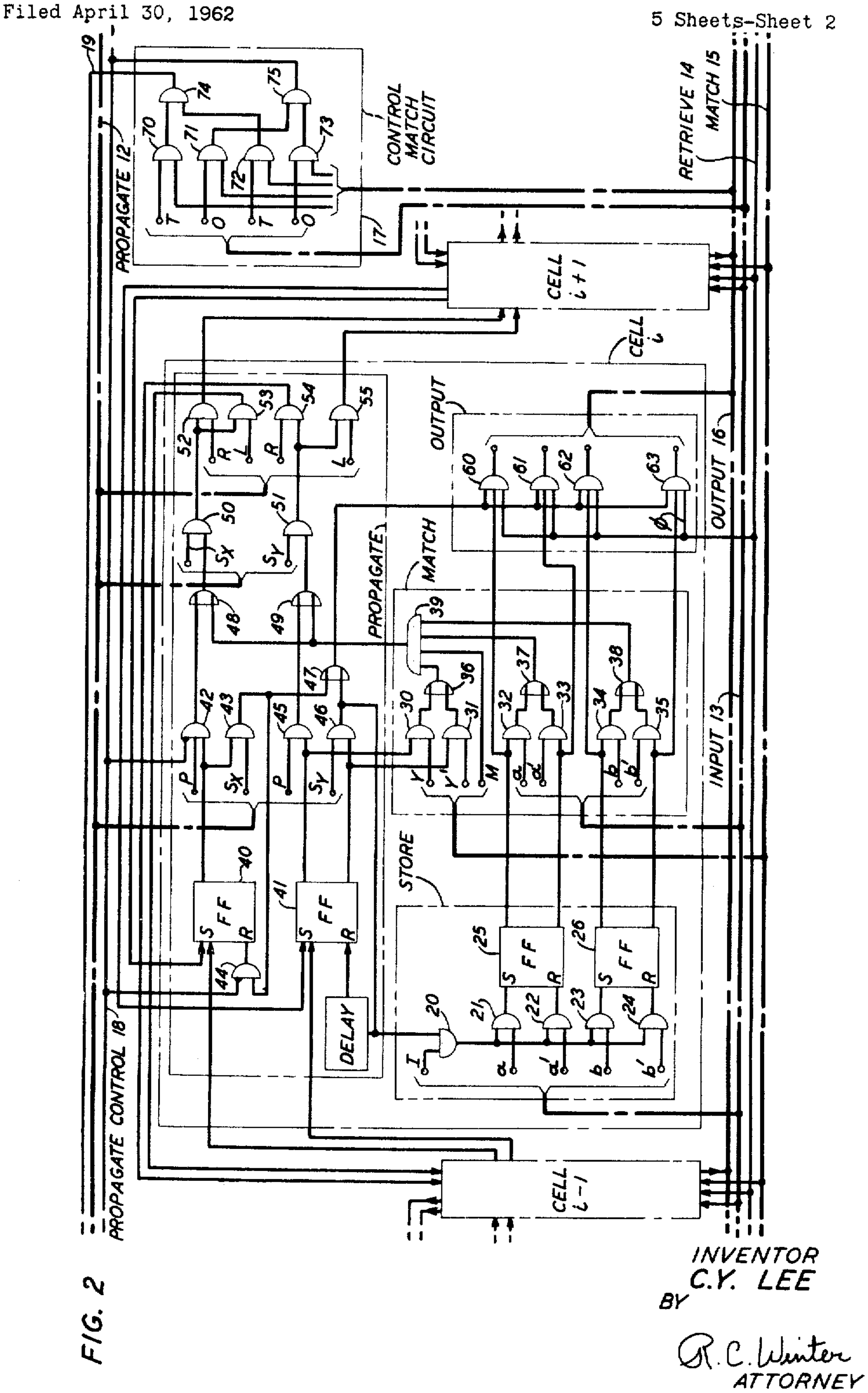
FIG. 2 is a schematic representation of one storage cell in the specific embodiment of FIG. 1.

A typical storage cell construction for performing the above operations in the network, in accordance with one illustrative embodiment of this invention, is shown in FIG. 2. As there depicted, the cell comprises a plurality of logic circuits well known in the art, including flip-flops and inhibit, AND and OR gates. These various operations will now be described in detail with reference to the schematic cell diagram of FIG. 2 and the pulse diagrams of FIGS. 6 through 10.

*The storage operation*

Figure 6:
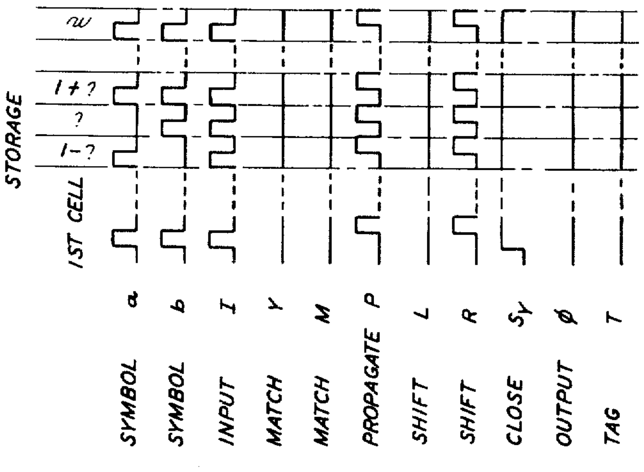

FIG. 6 is the pulse diagram designating the required inputs for storage of information in the memory. These inputs are directed to each and every cell in the memory, such that a description with regard to the schematic diagram of the cell in FIG. 2 will be adequate to describe the storage operation for the entire memory. Flip-flops 25 and 26 store the symbol for that particular cell. Two symbol storage flip-flops are illustrated, thus permitting only four distinct binary coded symbols to be stored in the memory. However, it is evident that the number of symbol storage flip-flops per cell may be extended to any number commensurate with the desired number of distinct symbols to be stored in the memory. There is no distinction between name and data symbols during the storage operation except for the fact that name symbols would normally precede the data symbols in the sequential pattern of storage.

The operation is initiated by setting activity flip-flop 41 in the very first cell of the memory. Thus this first cell varies from all of the other cells in the network by receiving an externally applied start activity signal instead of an intercell input to flip-flop 41 from cell $i-1$. Flip-flop 41 in the set state, coupled with an $S_Y$ signal applied to each of the cells in the network, serves to enable AND gate 46 in the first cell of the network, thereby energizing one input of input AND gate 20. Consider that it is desired to store a symbol represented in binary code form by both flip-flops 25 and 26 in the set state. For this purpose the I, *a* and *b* input leads are activated concurrently, thus setting flip-flops 25 and 26 upon enabling AND gates 20, 21 and 23.

Thereafter a propagate signal P is applied to the memory, serving to enable AND gate 45 in the first cell, the output of which is transmitted through OR gate 49 to enable AND gate 51 in conjunction with the $S_Y$ signal which is still being applied to the network at this time. The output of AND gate 51 in turn enables AND gate 55 upon receipt of the shift right signal R, which serves to propagate the active cell indication to the next cell $i+1$ in the network series. The delayed output of AND gate 46 in the first cell serves to reset flip-flop 41 at this time.

Consider now that the active cell is in position $i-1$, as indicated in the pulse chart of FIG. 6, and that it is desired to store the symbol A in this cell, represented by flip-flops 25 and 26 in the set and reset states, respectively. In this instance, flip-flop 41 of cell $i-1$ will be active, having been set by the previous cell in the network. With the $S_Y$ signal being applied continuously throughout the storage operation, AND gate 46 is also enabled, thus partially enabling AND gate 20. The input signals I, *a* and *b* are now applied to AND gates 20, 21 and 24, respectively, so as to place flip-flop 25 in the set state and flip-flop 26 in the reset state.

Having stored the desired information in the cell $i-1$, the activity signal in flip-flop 41 is now propagated to the next cell in the series network, which in this instance is cell $i$. This operation is implemented by again applying the propagate signals P and $S_Y$ and shift right signal R to the AND gates 45, 51 and 55, respectively. This in turn activates AND gate 45, OR gate 49, AND gate 51 and AND gate 55 in sequence to transfer the active state to flip-flop 41 of cell $i$. Flip-flop 41 of cell $i-1$ is in turn reset by the delayed output of AND gate 46.

The next inputs to the memory, representing the symbol $\beta$, will be $a'$, *b* and I. These inputs serve to set flip-flop 26 and reset flip-flop 25 in cell $i$. In the next time interval the propagate signals P and $S_Y$ and shift right signal R are again applied to the memory, and in this instance, since the flip-flop 41 of cell $i$ is the only one in the memory in the set state, this set condition will be propagated from cell $i$ to flip-flop 41 of cell $i+1$.

In this fashion the operation continues until all of the input information which it is desired to store has been applied to successive cells of the memory network. Upon completion of the storage operation, either all cells of the memory will have information stored therein or a series of empty cells will exist at the end of the series network.

*Retrieval operation*

Figure 7:
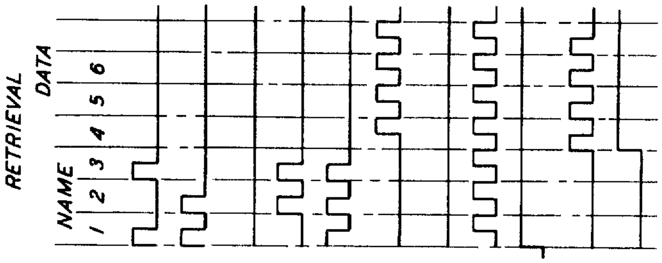

As indicated in FIG. 7, the retrieval operation is divided into two steps; first, the name symbols identifying the particular data which it is desired to retrieve from the memory are applied to the memory and matched with the stored name symbols. When all of the name symbols have been received and the matching process completed, the memory will automatically read out the data stored in the cells succeeding the name string matching the input name string.

The operation is referred to as direct retrieval when the sequence of events occurs in the order specified; i.e., name symbols matched against an input name string, followed by automatic read out of the stored data string identified by the matching name string. Thus consider, for example, that the matching operation is initiated by the application to the memory of the name symbol $\alpha$. In this instance a match signal M is applied to the memory simultaneously with the name symbol inputs on the *a* and *b* leads such that AND gates 32, 34 and 39 in the match portion of the cell will be partially enabled. If, in fact, this name symbol is stored in the cell *i* illustrated in FIG. 2, the set outputs of flip-flops 25 and 26 will enable AND gates 32 and 34, respectively, which in turn transmit their outputs through OR gates 37 and 38 to AND gate 39.

All of the activity flip-flops in the memory are inactive at the start of the retrieval operation. Thus flip-flop 41 in cell *i*, FIG. 2, provides its reset output to AND gate 31 which, coupled with the match input Y' at this point, enables AND gate 31 to deliver its output through OR gate 36 to AND gate 39. The matching operation is thus completed successfully, with the output of AND gate 39 being applied through OR gate 49 where, coupled with the $S_Y$ and R inputs, AND gates 51 and 55 in sequence set the activity flip-flop 41 in the next succeding cell of the network.

The $i+1$ cell, in this instance storing the second name string symbol, will thus have flip-flop 41 set at the time the second symbol in the name string is applied to the memory. Let us consider that the second name symbol applied to the memory is A and that the cell $i+1$, idencal in detail to cell *i* shown in FIG. 2, has the corresponding symbol $A=a'b$ stored therein. Thus flip-flops 41 and 26 in cell $i+1$ will be found in the set state and flip-flop 25 in the reset state. The input on leads $a'$ and *b* will serve to activate AND gates 33 and 34 in the match portion of cell *i*. At this point the signal Y is applied to each of the cells in the memory such that cell *i*, having the flip-flop 41 in the set state at this point, will have AND gate 30 in the match portion enabled. This, in conjunction with the match signal M, also applied at this time, will activate AND gate 39. The match output serves to propagate the active condition of flip-flop 41 to the succeeding cell in conjunction with the applied signals $S_Y$ and R through OR gate 49 and AND gates 51 and 55. The signal $S_Y$ also serves to enable AND gate 56 so as to reset flip-flop 41 in the same cell after an appropriate delay.

Consider then that cell $i+2$, which is now active, stores the symbol which matches the final symbol in the applied series of symbols. Thus the match portion of this cell will provide an output signal to propagate the active condition to cell $i+3$, which in this instance stores the first symbol of a data string. Absent further input information, the system now assumes a retrieval condition in which the data string corresponding to the applied name string is read out. For this purpose the retrieve signal $\varphi$ is applied to the memory together with the $S_Y$ signal. Since the only active cell in the network at this time is that in position $i+3$, the first cell in the data string to be read out, flip-flop 41 in that cell enables AND gate 46 to provide a signal through OR gate 47 to the output AND gates 60 through 63. The latter gates also receive the retrieve signal $\varphi$ and the content of the flip-flop 25 and 26 containing the stored data symbol. Thus AND gates 60 through 63 are enabled selectively and provide output signals corresponding to the stored data. The propagate signals P and $S_Y$, and shift right signal R are also applied, FIG. 7, serving to propagate the set condition of flip-flop 41 to the next succeeding cell $i+4$ in the network. This process is then repeated for the data symbol in the cell $i+4$, which is currently active, and so on through the data string.

The retrieval operation is concluded upon completion of the read out of information from the last cell in the data string and the activation of the cell storing the tag symbol introducing the next name string. As indicated in FIG. 2, control match circuit 17 receives in common the output of all cells in the memory and serves to compare these outputs with a particular symbol. In this instance the tag symbol $\alpha$ is applied to AND gates 70 and 72 throughout the retrieval operation, the other inputs to these gates being provided by the currently active cell. Thus when a cell storing the designated tag symbol is activated, AND gates 70 and 72 will be activated. This in turn enables AND gate 74 to provide an output signal which indicates to the network control that the retrieval operation has been concluded and that the output information is now complete. The output signal from AND gate 74 also activates circuitry in the input and control signal source to inhibit provision of the $S_Y$ and R signals to the cells so as to prevent further propagation of the activity condition through the network. The memory is thus restored to normal, with all cells inactive.

Figure 8:
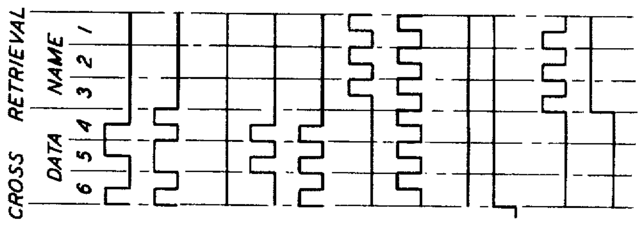
FIGS. 6 through 10 are pulse charts depicting various network operations.

The foregoing discussion is concerned primarily with the direct retrieval of data strings corresponding to an applied name string. It is also possible in accordance with this embodiment of the invention to retrieve name strings from the memory by applying a corresponding data string in reverse order. This cross retrieval, in effect, gives the reverse resultant to the direct retrieval operation. At the outset, as indicated in FIG. 8, the last symbol in a data string is applied to each cell in the network. The symbol indicated in FIG. 8 corresponds to inputs *a* and *b*. The matching operation proceeds as in the case of direct retrieval, and the output of the matching portion of the cell or cells containing the corresponding symbol serves to activate the propagating circuitry. However, rather than propagate the cell activity to the succeeding cell in the network sequence, a shift left signal L is applied to AND gate 54 in conjunction with the $S_Y$ signal applied to AND gate 51 so as to propagate the output of the match AND gate 39 to the flip-flop 41 of the preceding cell in the network sequence.

Succeeding symbols in the data string, as applied in reverse order, continue the reverse propagation of the cell activity such that, upon application of the final symbol to the memory, the cell containing the last symbol of the name string preceding the matched data string will be activated. At this point the automatic read out operation is initiated with the retrieve signal $\varphi$ and propagate signal P being applied to each cell. In the active cell of the name string, $S_Y$ together with the set output of flip-flop 41, enables AND gate 46, thus partially enabling output AND gates 60 through 63 via OR gate 47. The symbol as stored in flip-flops 25 and 26 and the $\varphi$ signal are also applied to output AND gates 60 through 63.

Dependent upon the particular stored symbol, output signals identifying that symbol thus are provided to the output circuitry. At the same time AND gate 45 is enabled by the propagate signal P and the set state of flip-flop 41 which, in conjunction with the $S_Y$ and L signals, serves to activate the preceding cell in the network sequence for read out of the next symbol in the name string.

The operation continues in this fashion to the end of the name string, and since this name string is read out in reverse order, appropriate temporary storage facilities will be provided in the output circuitry to hold this information until it has been completely recorded.

Throughout the cross retrieval operation the tag symbol $\alpha$ is applied to AND gates 70 and 72 of the control match circuit 17. The particular tag symbol $\alpha$ is the one which precedes each name string as stored in the memory. Thus, upon completion of the propagation through a name string in reverse order, a cell is reached which has stored therein the tag symbol $\alpha$ which matches that applied to the control match circuit 17. Upon read out of this symbol, AND gates 70, 72 and 74 are enabled to provide the control signal which inhibits the further application to the network of the $S_Y$ and L signals and halts the cross retrieval operation. After a brief delay flip-flop 41, in the remaining active cell in the memory, is reset. Thus, at the time of completion of the cross retrieval operation, all cells have been restored to the inactive state.

*Erase operation*

Information including name and data strings may be erased from any portion of the memory as well as from the entire memory in preparation for the storage of new information. To accomplish this result, the matching process is performed with the input comprising the tag symbol $\alpha$ and corresponding name string. It is assumed for this purpose that no two name strings as stored in the memory are identical. Thus at the end of this matching process, only one tag symbol $\beta$, identifying a corresponding data string, will be active.

A propagate left operation is then initiated which is terminated upon once again reaching the cell storing the name string tag symbol $\alpha$. To accomplish this, the content of each active cell is read out and compared in the control match circuit 17 with the name string tag symbol $\alpha$. The resultant control signal from AND gate 74 upon such a comparison causes the operation to again reverse itself. Propagation through the name string and data string is continued until the name string tag symbol $\alpha$ following the data string is reached, as evidenced by the comparison in the control match circuit 17. In this instance as the activity signal is propagated through the name and data strings, the stored symbol is read out of each cell, and a "vacant" symbol is stored in its place.

The circuit illustrated in FIG. 2 will perform the foregoing operation in the following manner. During the initial matching operation, the symbols corresponding to the name string and its tag symbol are applied in sequence, together with the signals M, R and $S_Y$, FIG. 9. Upon conclusion of the matching operation, the match signal M is removed, and the shift right signal R is replaced by the shift left signal L. The tag symbol $\alpha$ and retrieve signal $\varphi$ are also applied at this time.

When the matching of the name string tag symbol $\alpha$ occurs in the control match circuit 17, the direction of propagation reverses once more, and actual erasing begins. At this time the shift right signal R replaces the shift left signal L.

The tag symbol $\alpha$ is maintained in the match circuit 17 awaiting the retrieval of the next name string tag symbol from the memory. In the interim each successive cell output singal activates the input circuitry to apply the "vacant" symbol to the corresponding cell, thus serving to erase the information previously stored therein. With the arrival of the next name string tag symbol $\alpha$, the external control circuitry is alerted to halt the operation by removing all externally applied signals. Flip-flop 41 in the sole remaining active cell is reset after the predetermined delay. The memory is now in condition for the gap closing operation.

*Closing the gap*

Figure 10:
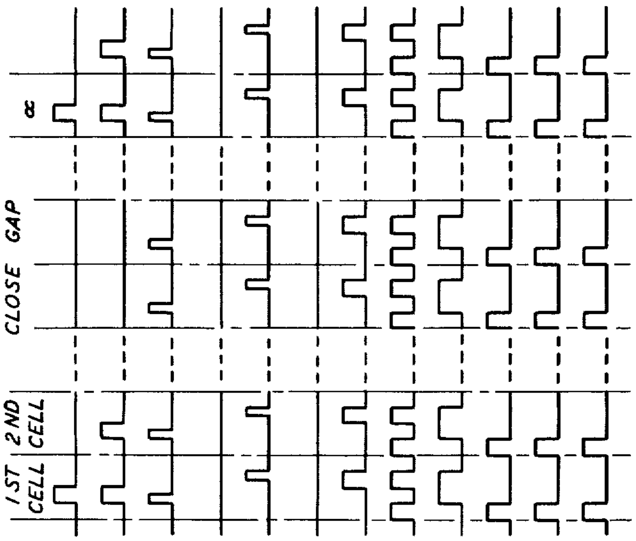
Figure 9:
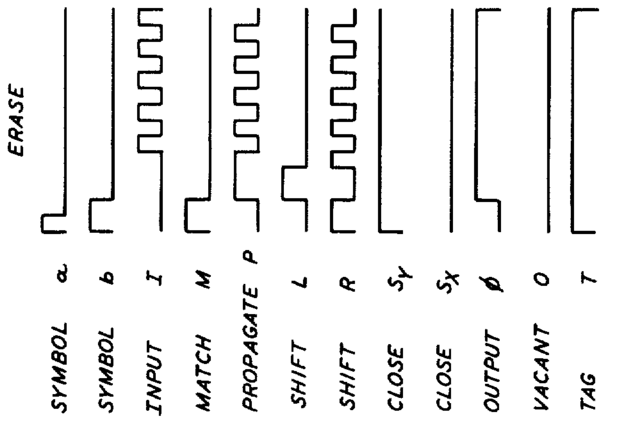

Assume for the purposes of this description that the memory currently contains the following information:

| Position | 1 | 2 | 3 | 4 | 5 | 6 | 7 | 8 | 9 | 10 |
|---|---|---|---|---|---|---|---|---|---|---|
| Symbol | $\alpha$ | A | $\beta$ | $\alpha$ | 0 | 0 | 0 | 0 | $\alpha$ | B |

where 0 corresponds to a vacant symbol in a cell from which information has been erased. The gap closing operation, FIG. 10, begins in the first cell of the network by setting flip-flops 40 and 41, the signals for the first cell being provided by the input and control signal source. Thereafter in the next time interval the output signal $\varphi$, FIG. 10, is applied to the memory, serving to read out the information stored in the cell having the activity flip-flop 41 set. For this purpose $S_Y$ is applied concurrently to the memory such that AND gate 46 is enabled, followed by selective outputs from the AND gates 60 through 63 indicating the particular stored symbol.

The $S_X$ signal is also applied to the memory at this time, serving to enable AND gate 43 in the cell having the activity flip-flop 40 in the set state. The output of AND gate 43 in the first cell merely supports the output provided by AND gate 46 in partially enabling the output AND gates 60 through 63.

The control match circuit 17 has a 0 signal, corresponding to the vacant symbol, applied to AND gates 71 and 73 during the entire gap closing operation. In this instance the first cell has the symbol $\alpha$ stored therein such that the vacant match circuitry fails to produce an output signal from AND gate 75. Thus inhibit gate 44, absent an inhibit input signal from AND gate 75, will permit the resetting of activity flip-flop after an appropriate delay. The activity flip-flop 41 is also reset shortly after application of the $S_Y$ signal to AND gate 46.

Prior to the resetting of the activity flip-flops 40 and 41, a propagate signal P is applied to AND gates 42 and 45, permitting the appropriate activity conditions to be transferred to the activity flip-flops in the cell in the second position of the network through the corresponding OR gates 48 and 49, AND gates 50 and 51 and, in conjunction with the shift right signal R, through AND gates 53 and 55.

The cells in the second through the fourth network positions store the A, $\beta$ and $\alpha$ symbols, respectively, so that the operation performed in the first cell position is repeated in each of these cells in succession. The cell in the fifth position is vacant. Thus, upon performing the gap closing operation in this cell, an output signal is provided by the vacant comparison gates 71 and 73 in the control match circuit 17 such that AND gate 75 provides a vacant output signal to inhibit the resetting of activity flip-flop 40 at inhibit gate 44. The output of AND gate 75 also serves to inhibit the further application of the propagate signal P to AND gate 42. In this fashion the cell in position 5 will retain activity flip-flop 40 in the set state, while the activity condition of flip-flop 41 is propagated to the cell in position 6 during the ensuing propagation interval.

At this point the state of the memory is such that the first vacant cell, position 5, has flip-flop 40 active and flip-flop 41 inactive while the next vacant cell, position 6, has flip-flop 40 inactive and flip-flop 41 active. All of the remaining cells in the network reflect both acivity flip-flops as inactive.

Succeeding operations serve to propagate only the flip-flop 41 activity condition through the series of vacant cells. Upon reaching position 9, the first cell beyond the gap, an output from AND gate 74 of the match circuit 17 serves to store the content of the position 9 cell in the cell having flip-flop 40 active; viz., the cell in position 5. With information once again stored in the position 5 cell, the vacant comparison output for that cell will no longer be present, permitting flip-flop 40 to reset and the active condition to be propagated to flip-flop 40 of the cell in position 6.

The operation thus continues through succeeding cells, with each cell having the flip-flop 41 active transferring its stored symbol to the first preceding cell in the network having the flip-flop 40 active. The final resultant is a series of vacant cells at the end of the network where it is convenient to apply new information for storage in the memory.

It is to be understood that the above-described arrangement is illustrative of the application of the principles of the invention. Numerous other arrangements may be devised by those skilled in the art without departing from the spirit and scope of the invention.

What is claimed is:

1. A memory comprising a plurality of data storage cells, means for storing data symbols in said cells, means in each of said cells for comparing the stored data symbol with a retrieval symbol applied simultaneously to each of said cells in the memory, enabling means, and means activated by said enabling means in cells indicating a match in the comparison means for activating said enabling means in an adjacent cell.

2. A memory in accordance with claim 1 wherein said data storage means comprises means for applying a data symbol for storage in the memory simultaneously to each of said cells and means for enabling the storage of the applied data symbol only in a distinct one of said storage cells.

3. A memory in accordance with claim 2 and further comprising means activated by said enabling means in said distinct cell for storing a succeeding data symbol in a cell adjacent to said distinct cell.

4. A memory in accordance with claim 3 and further comprising means in each of said cells for retrieving the data symbol stored in a cell having said enabling means active including means for applying a retrieval signal simultaneously to each of said cells in the memory, and means operative concurrently for activating said enabling means in a cell adjacent to a cell from which a data symbol is retrieved.

5. A memory device comprising a plurality of storage units, means for applying first signals simultaneously to each of said units, means in each of said units for comparing said first signals with stored data, means enabled by said comparison means for activating others of said units, and means for retrieving data from said activated units upon application of second signals simultaneously to each of said units.

6. A memory device in accordance with claim 5 and further comprising means in each of said activated units for activating others of said units in response to said second signals.

7. A memory device in accordance with claim 5 wherein said retrieving means comprises means for comparing said retrieved data with a fixed data symbol.

8. A memory device comprising individual storage units, each of said storage units comprising means for storing a data symbol, means for comparing the stored data symbol with an interrogating signal applied simultaneously to each of said storage units and means enabled by said comparison means for activating other storage units in the memory device, and means for retrieving data from said activated units upon application of an output signal simultaneously to each of said units.

9. A memory device in accordance with claim 8 wherein said data storing means comprises means for enabling each of said storage units in sequence to receive and store a data symbol applied simultaneously to all of the storage units in the memory device.

10. A memory device in accordance with claim 9 and further comprising activity control means and means interconnecting said control means in adjacent storage units, said interconnecting means comprising means for connecting said activity control means in one storage unit of a series connected plurality of said storage units to the activity control means in the preceding and the succeeding storage units as determined by externally applied signals.

11. A memory device in accordance with claim 10 wherein said activity control means comprises first and second register means and wherein said interconnecting means comprises means for independently propagating the activity condition stored in each of said register means.

12. A memory device in accordance with claim 11 and further comprising means for transferring the data symbol stored in said storage unit having said first register means active to another storage unit having said second register means active.

13. A memory device in accordance with claim 12 wherein said transfer means comprises means for comparing said retrieved data symbol with a control symbol and means for applying the output of said retrieval comparison circuit to said second register means in each of said storage units.

14. A data storage system comprising a plurality of distinct cells connected in series, each of said cells comprising data storage elements and activity indicating elements, means for applying a data symbol simultaneously to each of said plurality of cells, and means comprising said activity indicating elements for enabling the data storage elements in each of said cells in sequence to receive one of an applied sequence of data symbols.

15. A memory comprising a plurality of cells connected in series, each of said cells comprising data storage means, comparison means, output indicating means, first means for activating said storage, comparison and output means and means for propagating the condition of said first means and said comparison means from one cell to an adjacent cell to activate said first means in said adjacent cell, and means for storing a plurality of data symbols in a series of said cells comprising means for activating said first means in one of said cells and means operative thereafter for applying each of said data symbols in sequence to said plurality of cells.

16. A memory in accordance with claim 15 wherein said data storage means comprises a plurality of flip-flops and coincidence circuits and said first means comprises a flip-flop having one output connected through said coincidence circuits to inputs of said data storage flip-flops, said applied data symbols providing the other inputs to said coincidence circuits.

17. A memory in accordance with claim 15 wherein said propagating means comprises coincidence circuits connected to said first means in adjacent cells and receiving the output of said first means in the same cell together with externally applied propagate signals.

18. A memory in accordance with claim 15 and further comprising means for retrieving a plurality of data symbols from a corresponding series of said cells comprising means for applying each of a sequence of identifying symbols simultaneously to said comparison means in each of said cells and means operative thereafter for enabling said output indicating means to retrieve the symbol stored in an active cell and for enabling said propagating means.

19. A memory in accordance with claim 18 and further comprising means for terminating the retrieval operation including a comparison circuit connected in common to the output indicating means of each of said cells for comparing the output signals with a stored data symbol.

20. A data storage and retrieval system comprising a plurality of distinct cells connected in series, each of said cells comprising data storage elements, first activity indicating means, output elements and comparison means, means for applying signals indicating the content of said data storage elements and said activity indicating means to said comparison means, means for storing data in said data storage elements, and means for retrieving stored data from said system comprising means for applying each of a series of data symbols simultaneously to said comparison means in each of said plurality of cells, first propagating means responsive to a match in said comparison means of one cell for activating the indicating means in the succeeding cell in the series, and means for applying enabling signals to each cell following the application of said series of data symbols, said output elements in cells having the corresponding indicating means active being responsive to said enabling signals for providing output signals corresponding to the stored data symbol, said propagating means also responding to said enabling signals for activating the indicating means in the succeeding cell.

21. A data storage and retrieval system in accordance with claim 20 and further comprising second propagating means for activating the indicating means in the preceding cell in the series, said second propagating means being responsive to said externally applied enabling signals in conjunction with the output of said comparison means.

22. A data storage and retrieval system in accordance with claim 21 and further comprising means for erasing data from said system, said erasing means comprising common comparison means responsive to a match of the last-applied data symbol with the data symbol stored in an active cell for propagating the active condition through the indicating means in the preceding cells in the series, said common comparison means further responsive to a match of the stored data symbol corresponding to the first one of the series of applied data symbols for inhibiting further propagation, means operative concurrently with said last-mentioned means for activating said data storage elements in sequential activated cells to store a distinct symbol indicative of a vacant condition, and means comprising said common comparison means for terminating the erase operation upon again receiving the first of the series of applied data symbols from an activated cell.

23. A data storage and retrieval system in accordance with claim 22 and further comprising means for closing the gap created by the erasure of data from a sequence of cells including second activity indicating means in each cell, means for propagating the active condition of said second indicating means independently of said first indicating means, and means for retrieving the particular data symbol stored in a cell having said first indicating means active and for storing said particular data symbol in a cell having said second indicating means active.

References Cited by the Examiner

UNITED STATES PATENTS 2,900,620 8/59 Johnson ------------ 340—146.2

MALCOLM A. MORRISON, *Primary Examiner.*